United States Patent Office 2,979,863
Patented Apr. 18, 1961

2,979,863
SOIL CONDITIONING WITH QUATERNARY NITROGEN SALT

George R. Bauwin, Collinsville, Ill., and Frank X. Grossi, St. Louis, Mo., assignors to Union Starch and Refining Company, Inc., a corporation of Indiana No Drawing. Filed Mar. 12, 1956, Ser. No. 570,703

1 Claim. (Cl. 47—58)

This invention relates to a process of conditioning soils, especially those which have poor structure, by treating with a quaternary nitrogen salt.

This application is a continuation-in-part of U.S. application Serial No. 455,076, filed September 9, 1954, now Patent 2,893,166.

Among the objects of the invention is to provide a composition and a method for quickly improving the structure of soils.

Among other objects of the invention is to provide a method of increasing crop yields, of reducing erosion in soils, and of stabilizing exposed soil surfaces which are vulnerable to erosion until cover crops can be established.

Three important factors in the productivity of a soil are climate, physical condition of the soil, and the chemical fertility of the soil.

Among still further objects of the invention is to provide a method for improving the physical condition of a soil without detrimentally affecting the chemical fertility thereof.

Good soil structure is important because it makes it possible (1) for air and water to move into and through the soil; (2) for the soil to hold enough water in a form available for plants to use; and (3) for the plant roots to pass through and make use of the soil. It governs the size and distribution of soil pores which in turn govern the movement of air and water. Soils of good structure have a desirable range of pore sizes that (1) permit water to infiltrate readily and spread rapidly through the rooting zone; (2) allow excess water to be removed quickly from the soil; and (3) permit the exchange of gases (especially carbon dioxide and oxygen) through the pores.

Soils of good structure do not become water-logged readily during periods of high rainfall. As a result, oxygen necessary for growth and the proper functioning of plants is not a limiting growth factor.

Soils of good structure are not readily subject to shrinkage. Shrinkage results in compaction, especially in the form of soil crusts, and the formation of cracks and fissures. Compaction is undesirable in that normal plant growth is retarded, due to unfavorable growing conditions, and because excessive capillary action results in rapid loss of soil moisture through surface evaporation. Cracks and fissures are undesirable because they increase the rate of transfer of soil moisture to the atmosphere.

Aggregates found in soils which do not contain an optimum amount of organic matter in the proper state of decomposition or other soil conditioning agents, when saturated with water are very unstable. This lowered stability together with the impact exerted on soil by raindrops, causes considerable destruction of aggregates in the surface soil. The dispersed soil particles will clog soil pores and prevent infiltration and percolation of water and exchange of gases. Upon drying, this dispersed surface layer of soil may form a compact crust that makes it difficult for air and water to enter the soil and results in poor germination of seeds. When moist, this "puddled" layer will not admit water readily and excess moisture will either flow across the surface of the soil or will be channelized. In either case, large quantities of valuable soil will be lost through erosion.

One phase of this invention is based on the discovery that 0.01% and greater by weight of certain quaternary ammonium salts improves the physical condition of the soil or the soil structure to a remarkable extent. Although there is no practical upper limit to the amount of such conditioner that can be added, 0.1% appears to produce good results in even the poorest soils.

The quaternary ammonium salts employed are salts of the following structural formula

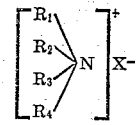

in which X is an anion, $R_1$ is a hydrocarbon radical containing 6-22 or more carbon atoms and $R_2$, $R_3$, $R_4$ are selected from the group consisting of hydrogen, alkyl, aryl and alkyl aryl radicals. Very good results were obtained with quaternary ammonium salts in which two or more radicals $R_1$ and $R_2$ for example, contain 6-22 or more carbon atoms. Two or more of the substituents $R_3$ and $R_4$, for example may be united to form a pyridinium, morpholinium, quinolinium, piperidinium, isoquinolinium or nicotinium radical. Theoretically a bactericide would be the worst of all possible soil conditioners. Evidence indicates that this unexpected inactivity is due to the neutralization of the cationic or surface activity of the salt by reaction with the colloidal complex of soils.

Another phase of the invention is based on the discovery that the soil conditioners of this invention have unique properties when it comes to improving the engineering qualities of soils. Heretofore, the emphasis has been placed on improving the agricultural properties of soils and the usual assumption that any material which would improve the agricultural properties of a soil would have quite the opposite effect with respect to engineering qualities does not apply to the soil conditioners and stabilizers of the present invention. The term "engineering qualities," as used in this specification, relates to the property of a soil to provide a more or less suitable support for engineering structures, road beds, for example or building foundations or subsurface walls.

After a heavy rainfall roadways or pavements may collapse. This is frequently caused by water seeping into the subgrade of the road from run-off and forming a soft mud. When a heavy load passes over such a section the mud is squeezed out. Such a process, repeated many times is called "pumping" by road engineers. When the water recedes, or the soil dries out, a void or cavity is formed and the pavement cracks or caves in when heavy loads pass over.

Among other objects of this invention therefore is to provide a soil treating chemical which impedes or restricts the entry of moisture into the soil.

The dual nature of the soil additives of the present invention may be explained as follows. The ability of these soil aggregants to form water stable aggregates is of significance in the improvement of soil structure. The treated layer of soil possesses permeability to moisture and air provided the aggregates are greater than 0.25 mm. in diameter—in other words, the size of the aggregates is important from an agricultural standpoint. The moisture percolates to the subsoil as a result of a porous top layer. The presence of this reservoir of moisture in the subsoil helps to promote healthy plant life. The virtual loss of capillarity in the treated top layer of soil may appear antagonistic but actually it prevents dissipation of the stored moisture which normally is sucked to the surface and lost by evaporation. In engineering practice porosity is highly undesirable and the soil is mechanically compacted at an optimum moisture level. In other words the soil is densified so that pockets of moisture which raise havoc with the structural stability of the soil during wetting and drying and freezing and thawing cycles are eliminated. An agent which impedes the entry of moisture into this soil base will naturally reduce the strain imposed on soil structure by the vicissitudes of the weather.

The field installations described in Examples 6 and 7 have been opened to vehicular traffic for several months and have been under observation. So far, the bituminous pavement in the control strips is showing signs of disintegration while the pavement over treated areas and granular base is still intact.

Still another phase of the invention is based on the discovery that, compared with other synthetic soil conditioners of the anionic polyelectrolyte type, the quaternary ammonium salts are easier to apply to the soils. The anionic polyelectrolytes are electronegative and may be inactive and/or precipitated by small quantities of soluble polyvalent salts of $Al^{+++}$, $Fe^{+++}$, $Mn^{++}$, $Zn^{++}$, etc. found in soils. Also, it is possible that the plants growing in the soil may be deprived of certain indispensable trace elements by such reaction with the anionic polyelectrolytes.

Examples of the quaternary ammonium salts which can be employed, include hexadecyl, octadecyl, dimethyl ammonium chloride; octadecenyl, hexadecyl dimethyl, ammonium chloride; octadecyl, trimethyl, ammonium chloride; dihexadecyl dimethyl, ammonium chloride; dioctadecyl dimethyl, ammonium chloride; octadecyl pyridinium chloride; octadecyl methyl morpholinium chloride; octadecyl quinolinium chloride; dilauryl piperidinium chloride; octadecyl nicotinium chloride; octadecyl isoquinolinium halide and mixtures thereof.

The soil conditioner of the invention is very satisfactory when applied as a composition comprising one percent or more of the conditioner and an extender which is relatively inert. Suitable extenders include sawdust, tailings and spent carbon from the corn wet milling industry, talc, clays, inorganic pigments, dry powdered corn starch, various fibers, etc. The mixture should pass through a 150 mesh screen. The conditioner may also be applied alone or as an aqueous solution, by spraying for example. Since the quaternary ammonium salts are surface active they have the advantage (over the high polymer type of soil conditioner) in that they readily penetrate into the soil.

The invention both as to its organization and its method of operation together with additional objects and advantages thereof will best be understood from the following description of specific embodiments thereof.

*Example 1*

To a first area of a soil, known as Putnam silt loam surface soil there was mixed about 0.05% of dioctadecyldimethyl ammonium chloride which had previously been mixed with an inert extender comprising spent carbon from the corn wet milling industry. To other areas anionic polyelectrolyte soil conditioners or no soil conditioner was added. Philodendron plants and rubber plants were transplanted to such soils. After several weeks the plants grown in the first area had a healthy appearance and compared favorably with plants in areas containing other soil conditioners. The treated soil also contained molds indicating that the quaternary salt additive had no detrimental effect on all soil microorganisms. Pea seeds planted in the soil of the first area germinated normally. These preliminary tests and many other have demonstrated the desirable effect of the additions on soil.

The following examples are of experiments designed to establish reasons for the beneficial action of such compounds on soils.

*Example 2*

This example compares the ability of dioctadecyl dimethyl ammonium chloride (QI) to form stabilized agglomerates, with that of (1) a polymer which is a high viscosity sodium carboxymethyl cellulose (CMC-120), (2) the copolymer known as vinyl acetate maleic anhydride (VAMA), also (3) the quaternary ammonium salt added in spent carbon as an extender (2 parts by weight of QI in 98 parts by weight of spent carbon were mixed, and 5 parts by weight of this mixture were added to 95 parts by weight of soil) was tested.

In all of the tests 100 grams of Putnam silt loam surface and subsurface soil was pulverized to pass a 0.25 mm. sieve. To this soil the polymer or quaternary ammonium salt is added and 30 ml. of distilled water is added. After thorough mixing the soil was pressed through approximately the same sized area as a 4 mm. sieve. The resultant crumbs were air dried for at least two days. 40 gram samples were then placed on a 0.25 mm. sieve which had originally passed the particles thereof. The sieve was lowered into a water bath to a point where the soil just began to wet from below and held there until the crumbs were completely wetted by capillarity. Then the sieve was lowered and raised in the water through a distance of 2 inches, 120 times. Thereafter, the sieve was removed from the bath, allowed to drain and the soil dried at 105° C. and weighed. This measured the percent of stable aggregates under conditions of the test which were greater than 0.25 mm. The following table gives the results obtained:

SURFACE SOIL

| Amount of Addition | QI | VAMA | CMC-120 | QI with spent carbon |
|---|---|---|---|---|
| 0.1 | 90.0 | 75.0 | 62.3 | 87.5 |
| 0.075 | 73.0 | 59.5 | 52.8 | 70.0 |
| 0.05 | 58.3 | 43.5 | 34.0 | 51.0 |
| 0.03 | 26.3 | 23.8 | 16.0 | |

SUBSURFACE SOIL

| | | | | |
|---|---|---|---|---|
| 0.1 | 97.3 | 48.0 | 26.5 | 95.0 |
| 0.075 | 94.0 | 36.0 | 16.0 | 90.0 |
| 0.05 | 80.0 | 30.5 | 11.5 | 77.5 |
| 0.03 | 73.8 | 13.5 | | |

Comparable results were obtained when additional amounts of distilled water were added to the samples.

*Example 3*

It was noted during the progress of the experiments with growing plants that soil treated with quaternary ammonium compounds of the invention and reworked lost almost none of its desirable aggregate stability whereas it is known that most soil conditioners of the polymeric type of polyelectrolytes have to be replaced or supplemented after reworking the soil or the soil has to be treated with excess OH-ions or phosphate ions. The following tests show how the reworking affects the soil containing the conditions. This is a laboratory procedure for simulating over tillage of soils; and indication of the mechanical break down of said aggregates.

Soils containing 0.1% of QI and 0.1% of VAMA were each divided into 3 portions. The first portion of each sample was treated as in Example 2. The second portion was pulverized mixed with 30 ml. water, aggregated by passing through 2 mm. sieve and air dried as before but instead of wet sieving the product was repulverized, mixed with water, aggregated and air dried a second time before wet sieving. In the third sample the pulverizing, etc., steps were carried out a total of 3 times. The following table shows the results.

| No. of times reworked | QI | VAMA |
|---|---|---|
| 0 | 90.0 | 75.0 |
| 1 | 92.0 | 15.5 |
| 2 | 91.3 | 5.3 |

Example 4

Although it was known from Example 1 that the quaternary ammonium salts do not prevent the growth of all soil microorganisms the following tests were run to determine the effect on the processes of ammonification and nitrification. To the 100 gram samples of Putnam silt loam surface soil pulverized to pass a 0.25 mm. sive was added 0.3 gram of calcium carbonate, 0.25 gram of finely-ground alfalfa, and the appropriate amounts of conditioner. Thirty ml. of distilled water was then added. The soil and additives were well mixed and pressed through approximately the same sized area of a 4-mm. sieve. The soil crumbs were allowed to air-dry at least two days. Fifty gram samples were placed in 500 ml. Erlenmeyer flasks and incubated at an optimum temperature and moisture level for 75 days. Nitrate-nitrogen was then extracted with 100 ml. of a 10 percent solution of acetic acid and the concentration determined by using a colorimetric procedure which was based upon the formation of a pink dye through the interaction of nitrous acid (produced by the reduction of nitrates with zinc) with alpha-napthylamine and sulfanilic acid in an acid medium. The results are as follows:

Percent QI in soil:   Concentration of $NO_3$—(p.p.m.)
   None _____ 374
   0.1 _____ 376
   0.075 _____ 378
   0.05 _____ 374

Samples without the addition of organic-nitrogen, such as alfalfa, after a similar incubation period, contain a very low concentration of nitrate nitrogen.

Examples 2–4 above attempt to measure in a quantitative way the effects of the soil conditioner of the invention. The improvement in agricultural properties of soils due to these effects have been noted in a qualitative way in actual growth experiments on outside soils. The qualitative observations may be summarized as follows:

The incorporation of the specified quaternary ammonium compounds in concentrations ranging from 0.01% and greater based on the weight of dry soil will result in noticeable increases in the percentage of water stable aggregates exceeding in diameter 0.25 mm. This results in increased non-capillary pore space, rapid percolation of rainwater to the sub-soil, and improved water holding capacity. A discontinuous soil structure means a more gradual release of moisture to vegetation. Treated soils do not slake down, or puddle, after a heavy rainfall thus minimizing erosion. The rapid drainage to the subsoil results in quicker drying out and affords the farmer an earlier opportunity to work the soil.

Soils treated with the prescribed nitrogen compounds do not compact, crust or form cracks. There is no alternate expansion and contraction as with soils treated with the anionic polyelectrolytes.

The moisture level of the soil to be treated is not as critical with the quaternary ammonium compounds as with the polyelectrolytes.

Alternate freezing and thawing have shown no reduction in the efficiency as soil aggregants of the above mentioned quaternary ammonium compounds.

One striking difference in the behavior of the cationic electrolyte type of soil aggregant and the anionic polyelectrolyte type with respect to the agricultural properties of the soil is in the re-workability or re-aggregation of treated soils.

In addition to the above noted properties of soils treated with the compounds of the invention supplementary effects have been found which improves the properties of the soil for engineering purposes. For convenience, the additive, dioctadecyl dimethyl ammonium chloride is referred to as DDAC in the following examples.

Observations with treated soil particles less than 0.25 mm. in diameter show almost complete loss of capillary conductivity. This may be explained by the fact that by rendering the soil particle surfaces hydrophobic, DDAC increases the contact angle between soil and water in the presence of air. This change in contact angle greatly reduces (or may actually eliminate) the tendency of water to migrate into the microscopic pores of a soil by capillarity and also make entry of water into the microscopic pores by gravitational forces more difficult. By the same token, it becomes easier to displace water from the soil voids by air. Thus, absence of large capillary imbibition pressures, and ease of water displacement by air, would account for low moisture pick up, low moisture retention, and high hydraulic stability. Thus a 61.7% reduction in the moisture equivalent of the Putnam silt loam was realized by the 0.1% treatment with DDAC. And, in another instance, an aggregate or clod of similarly treated Putnam silt loam with an initial weight of 188.6 g. gained 21.9% in weight when immersed in water for a period of 44 days. In comparison, the same soil (untreated) gained 39.3% in weight by capillarity in a relatively short time.

The reduced capacity of the treated soil to absorb water has resulted in two other changes in the physical properties of the soil: (1) A lowered tendency to expand and contract with alternate wetting and drying, and (2) a greater compressive strength when the treated soil is soaked in water for prolonged periods of time.

Repeated wetting and drying of soil is accompanied by alternate contraction and expansion. The effect of volume changes is to cause disruption of soil aggregates or clods into smaller units when the dried soil is wetted. The rapid intake of water causes unequal swelling throughout the clod which produces fracture and fragmentation along the cleavage planes. Then, too, the penetration of water into the capillaries results, first in a compression of the occluded air and finally in a virtual explosion within the clod as the pressure of the entrapped air exceeds the cohesion of the particles. Yodir (Yodir, R. E., Jour. Amer. Soc. Agron., 28, 337, (1936)), has shown that slow wetting by capillarity does not cause violent disruption of the clod but if the clod is immersed in water disintegration into smaller fragments takes place as the air is expelled. With a soil treated with DDAC the capacity to adsorb water has been reduced, its rate of water adsorption lowered and consequently its tendency to expand minimized. The air occluded in the pores is free to escape as its place is occupied by the slowly entering water.

Example 5

*Expansion and contraction of Putnam silt loam treated with 0.1% DDAC.*—A rectangular block with following dimensions 2.56 x 2.83 x 2.99 cm. as measured with a vernier caliper was carved from a large aggregate of Putnam silt loam treated with 0.1% DDAC. The dry weight of the block was obtained and then the block was immersed in a beaker of tap water for 1 hr. The block was withdrawn, excess moisture on the faces was blotted up, and the dimensions as well as the weight were taken. The block was allowed to dry at room temperature for 48 hrs., its weight taken, and then re-immersed for a longer period. This process of recording changes, if any, in weight and dimensions with cyclic wetting and drying was repeated for five times. The results are tabulated in the following table:

TABLE: CHANGES IN WEIGHT AND VOLUME WITH CYCLIC WETTING AND DRYING OF BLOCK OF PUTNAM SILT LOAM TREATED WITH 0.1% DDAC

| Cycle | Time (Hrs.) Block is immersed | Initial Volume of Block, cm.³ | Initial Weight of Block, gms. | Percent Change in Volume After Immersion and Drying, Expansion +, Contraction − | Percent Change in Weight after Immersion and Drying, Expansion +, Contraction − |
|---|---|---|---|---|---|
| 1 | 1 | 21.66 | 35.661 | −2.03 | +0.03 |
| 2 | 2 | 21.22 | 35.673 | +0.00 | +0.04 |
| 3 | 3 | 21.22 | 35.689 | +0.71 | −0.02 |
| 4 | 5½ | 21.37 | 35.683 | −0.70 | −0.21 |
| 5 | 24 | 21.22 | 35.608 | −0.33 | −0.19 |
| 6 | 48 | 21.29 | 35.540 | +1.45 | −0.15 |

An examination of the data accumulated in the table will show the increased resistance of a treated Putnam soil to volume and weight changes concomitant with cyclic wetting and drying.

In the experiment with blocks of treated Putnam silt loam it has been demonstrated how the compressive strength is a function of the moisture adsorbed by the treated soil when immersed. Prolonged periods of immersion indicate that treatment with 0.1% DDAC imposes a limit on quantity of water adsorbable at about 21%. Since this is lower than the value for untreated soil, the treated soil aggregate remains intact by virtue of the decreased water adsorption.

Theoretically, if the immersed block of treated soil does not soak up moisture any further, and if it is not subject to forces greater than the break point, it should resist disintegration indefinitely in its aqueous surroundings. In actual practice, other forces created by the turbulence of water will naturally affect the length of time an aggregate of immersed treated soil will remain intact. Tests have shown that the compressive strength is inversely related to the time of immersion or percentage of water adsorbed. The values for the compressive strength of the treated and untreated Putnam soil are somewhat parallel up to a moisture content of roughly 15%, above this figure the compressive strength of the untreated falls off rapidly while that of the treated appears to reach a constant value.

It should be mentioned at this point that soils treated with DDAC did not possess at low water content the spongy and plastic characteristics that soils treated with VAMA exhibited.

*Example 6*

A section of a road approximately 400 feet long and 22 feet wide to be covered with asphaltic material was prepared for padding by mixing with the soil of the road bed to a depth of about 6 inches approximately 1.2 lb. of DDAC per 1000 lbs. of soil (dry basis). The average moisture content and density of the soil was determined. Two drums containing 797 lbs. of 75% active DDAC were incorporated into the soil which was determined to contain 497,200 lbs. dry weight. The moisture content was determined as 10% and the maximum compaction for the soil was found to be at a moisture level of 15%. Therefore 6% additional water including 1% extra to allow for evaporation was to be added in the process. The soil in the said strip which had previously been graded was thoroughly pulverized and mixed by several passes of a Seaman Pulvi-mixer to a depth of 6 inches. Approximately ¼ of the DDAC to be added was dissolved in a portion of the water to be added and sprayed onto the pulverized soil as evenly as possible. The soil was remixed with the mixer. This step was repeated 3 times until all of the DDAC and all but 400 gal. of the required water had been added.

The strip was next graded and then compacted with a 10 ton roller. To eliminate cracks and fissures the remaining 400 gal. of water was sprayed over the surface. Thereafter, a one inch mat of bituminous pavement was laid over the test strip.

The soil of this strip had a high clay content and contained numerous stones. The subgrade was classified as or graded down to the "B" or "C" horizons.

*Example 7*

In a similar way about 0.109% of active DDAC was applied to a similar strip of the soil of a road bed 240 feet long, 22 ft. wide and 6″ deep which consisted essentially of an 80% silt devoid of any stones. This soil had considerably less cohesion than the soil of Example 6 and the subgrade was classified as belonging to the "A" horizon.

The soils resulting from the additions as set forth in Examples 6 and 7 have several advantages, for example, they are substantially permanently immune to the loss of supporting values due to adsorption of moisture and they have a higher bearing value than without the additions. The stability to loss of supporting values is at least partly due to the fact that water adsorption by capillarity has been reduced to a minimum. The field installations in Examples 6 and 7 have been opened to vehicular traffic for several months and have been under observations. So far, the bituminous pavement in the control strips is showing signs of disintegration while the pavement over treated areas and granular base is still intact.

Substantially the same process employed in Examples 6 and 7 can be employed to improve the engineering properties of back fills in house or building construction, to reduce the capillarity of farm ponds and irrigation ditches, to provide for "water proofing" of farm yards, highway shoulders, levees, and tennis courts. Turbid waters may also be flocculated with the product of the invention.

The features and principles underlying the invention described above in connection with specific exemplifications will suggest to those skilled in the art many other modifications thereof. It is accordingly desired that the appended claim shall not be limited to any specific feature or details thereof.

We claim:

The method of improving the physical structure of soils comprising incorporating in at least one of the surface layer and the subsurface layer, a powdered composition containing a cation active quaternary nitrogen salt having two substituent groups directly attached to the quaternary nitrogen, which groups contain 6–22 carbon atoms in a straight chain, the other two covalent nitrogen bonds being part of a heterocyclic ring, said powdered composition being added in sufficient quantity to provide about 0.01% to about 0.1% by weight of said soil layer of said cation active salt.

References Cited in the file of this patent

UNITED STATES PATENTS

| | | |
|---|---|---|
| 2,134,543 | Andrews | Oct. 25, 1938 |
| 2,295,505 | Shelton | Sept. 8, 1942 |
| 2,348,458 | Endersby | May 9, 1944 |
| 2,378,235 | Miles | June 12, 1945 |
| 2,592,273 | Goebel | Apr. 8, 1952 |
| 2,751,713 | Abramitis | June 26, 1956 |
| 2,807,910 | Erickson | Oct. 1, 1957 |
| 2,831,779 | Erickson | Apr. 22, 1958 |
| 2,893,166 | Bauwin et al. | July 7, 1959 |

OTHER REFERENCES

Publications:

"Manual on Fertilizer Manufacture" (Sauchelli), published by Davidson Chem. Co., Baltimore (1946). Only page 95 is relied on.

Grim et al.: (I) "Reaction of Different Clay Minerals with Some Organic Cations," published May 1, 1947, in (Other references on following page)

OTHER REFERENCES

Journal of American Ceramic Society, vol. 30, No. 5, pages 137 through 142.

Grim et al.: (II) "Reaction of Clays with Organic Cations . . .," published May 1, 1947, in Journal of American Ceramic Society, vol. 30, No. 5, pages 142 through 145.

Clare: "Effect of Cetyl Pyridinium Bromide on . . . Soil," published December 13, 1947 in Nature (magazine) at London, England, vol. 160, No. 4076, pages 828 and 829.

Jordan: "Organophilic Bentonites," published February 1949 in Journal of Physical and Colloid Chemistry, vol. 53, No. 2, pages 294 through 306.

Davidson: "Large Organic Cations As Soil Stabilizing Agents," published December 28, 1949 by Iowa State College of Agriculture and Mechanic Arts, Ames, Iowa, as Bulletin 168 of Iowa Engineering Experiment Station. Another form of citation is Iowa State College Bulletin, vol. 48, No. 31. There are 51 pages in all, but only pages 5, 15, 49, 50, 51 are relied upon.

Davidson: Bulletin 168 of 1949, pages 6 through 14 and pages 16 through 24.

Davidson: "Exploratory Evaluation . . .," published by Highway Research Board, Washington, D.C., in Proceedings of 29th Annual Meeting of Highway Research Board, "vol. 29 of 1949" (but apparently first printed in 1950), pages 531 through 537.

Hauser: "Organophilic Clays," published 1950 by Reinhold (N.Y.) in vol. 7 of "Colloid Chemistry," pages 431 through 441.

Onyx Technical Data Sheet No. IND.-6, Product Ammonyx-T, published 1952 by Onyx Oil and Chemical Co., Jersey City, N.J., two pages.

"Handbook of Material Trade Names" (Zimmerman et al.), 1953. Edition published by Industrial Research Service (Dover, N.H.), 1953. Page 44 relied on.

Michaels: "Altering Soil-Water Relationships by Chemical Means," published before Aug. 21, 1953 in Proceedings of the Conference on Soil Stabilization, Mass. Institute of Technology, June 18-20, 1952. Pages 59 through 67.

Marth: "Growth-Controlling Effects of Some Quaternary Ammonium Compounds . . .," published in Botanical Gazette, December 1953, vol. 115, No. 2, pages 200 through 204.